July 2, 1968 TOSHIHIKO NAGAMURA 3,390,605
DEVICE FOR MEASURING SIMULTANEOUSLY BOTH ROTATORY
POLARIZATION AND LIGHT ABSORPTION
Filed Oct. 20, 1964 2 Sheets-Sheet 1

United States Patent Office 3,390,605
Patented July 2, 1968

3,390,605
DEVICE FOR MEASURING SIMULTANEOUSLY BOTH ROTATORY POLARIZATION AND LIGHT ABSORPTION
Toshihiko Nagamura, Hirakata, Osaka, Japan, assignor to Yanagimoto Seisakusho Co., Ltd., Nakagyo-ku, Kyoto, Japan
Filed Oct. 20, 1964, Ser. No. 405,299
Claims priority, application Japan, Oct. 23, 1963, 38/56,892
2 Claims. (Cl. 88—14)

ABSTRACT OF THE DISCLOSURE

A device for measuring simultaneously both rotatory polarization and light absorption in which a beam of monochromatic light is split by a diplopic prism assembly into a pair of beams of polarized light in the different directions, and one of the divisional beams of polarized light passes through an optical path for the rotatory polarization measuring while the other of the divisional beams passes through a reference side optical path which cooperates with a sample side optical path for the light absorption measuring, the sample side optical path being partially common to the optical path for the rotatory polarization measuring.

---

This invention relates to a new and improved device for measuring simultaneously both rotatory polarization and light absorption.

Rotatory dispersion curves which are obtained by measuring rotatory polarization of light having its wavelength varied continuously are of vital importance in studying the chemical structure of optically active substances or in qualitative and quantitative analysis of various compounds and compositions. On the other hand it is known that there exists functional and close relation between rotatory dispersion and light absorption. It would, therefore, be very convenient if rotatory dispersion and light absorption of a substance to be analyzed can be determined at a time and with a single device, whereby various and useful informations may be obtained on the sample to be studied and usefulness and applicability may be increased.

It is, therefore, a principal object of this invention to provide a new and improved device for measuring simultaneously both rotatory dispersion and light absorption.

Another object of the invention is to provide a device for recording both rotatory dispersion curves and light absorption curves on the same recording diagram. It is also possible to record them simultaneously through the utilization of a known double recording mechanism.

A further object is to provide a device for measuring simultaneously both rotatory polarization and light absorption, in which only one sample cell is used at a fixed position. According to the invention, it is not necessary to shift the sample cell alternately in relation to the measurement of rotatory polarization and light absorption, respectively.

A still further object of the invention is to provide a new and useful device for simultaneously measuring both rotatory polarization and light absorption, in which a divisional light beam inherent in measurement of rotatory polarization is conveniently utilized in measurement of light absorption and the light absorption measuring is carried out in such a manner that it does not affect the rotatory polarization measuring.

A still further object of the invention is to provide a new and useful device for simultaneously measuring both rotatory polarization and light absorption, in which rotatory polarization is determined by an optically null system with the oscillating polarization, while light absorption is determined through the utilization of the system of a two optical paths alternately illuminating type which is also known as an ideal type for spectrometers.

Other objects and advantages of the invention will become apparent from the detailed description which follows when taken in conjunction with the accompanying drawings in which.

Figure 1:
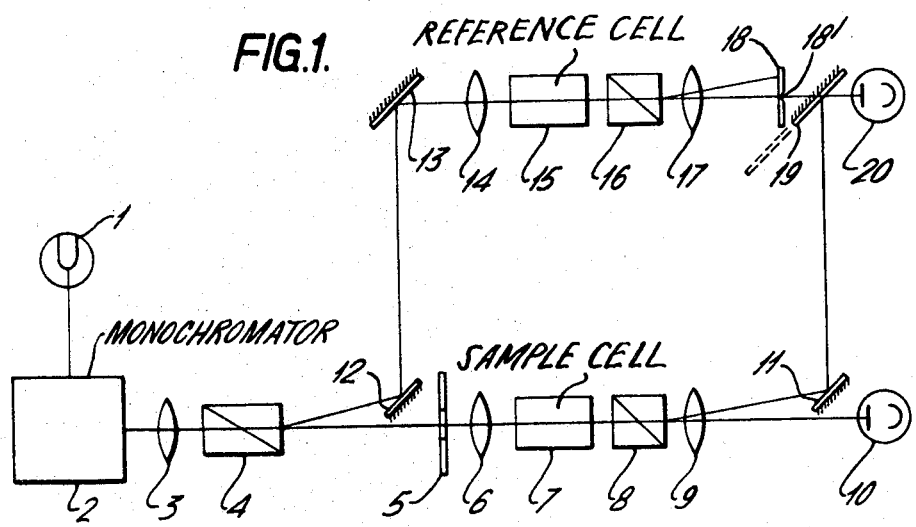
FIG. 1 is a schematic view of the optical system embodying the invention.

Referring now more particularly to the drawings, the basic system of the device of the invention is illustrated in FIG. 1. A light source 1 illuminates the system. Since the system according to the invention is to be used for the study of rotatory dispersion (spectropolarimetry), the system is illuminated with one selected wavelength at a time through the utilization of a suitable spectroscope or monochromator 2. The wavelength of monochromatic light leaving the monochromator 2 may be varied continuously and automatically with increasing time. A lens 3 is located to make an image of the outlet slit of the monochromator 2 at a predetermined position. 4 is a diplopic prism, for example, a Rochon prism, used as a polarizer and comprises a pair of rock crystal or calcite prisms joined to each other by a suitable bonding agent, said pair of prisms having their optical axes precisely fixed so that a pair of beams of polarized light which are orthogonal to each other may leave the prism assembly 4 in different directions. It should be understood that in FIG. 1, the polarized light having its plane of polarization in the direction parallel to the paper sheet goes straight through the Rochon prism 4, while the polarized light having its plane of polarization in the direction vertical to the paper sheet is deflected by the Rochon prism 4, preferably, at 1 to 3° relative to the axis of the incident light thereon. These two beams of polarized light, one going straight and the other being deflected, are hereinafter referred to as the first light beam and the second light beam, respectively.

In the optical path of the first light beam from the prism assembly 4 are arranged a polarization plane oscillator 5, a collimating lens 6, a sample cell 7, another diplopic prism assembly 8 as the analyzer and a lens 9 in that order. The polarization plane oscilaltor 5 may be of any conventional type. For example, it may comprise a pair of potically active transparent plates having the same specific rotatory power but in the opposite directions to each other, respectively, said pair of optical active transparent plates being inserted in the optical path alternately The plane of polarization of the polarized light leaving the oscillator 5 is oscillated at a predetermined frequency. The lens 6 collimates the oscillating polarized light. The sample cell 7 comprises a transparent container for the liquid sample to be analyzed. The prism assembly 8 is a so-called Senalmont prism which comprises a pair of rock crystal or calcite prisms joined to each other as well as the before-mentioned Rochon prism 4. The oscillating polarized light entering into the prism assembly 8 is divided into two beams, one having its plane of polarization vertical to the paper sheet and going straight toward a photoelectric tube 10 and the other having its plane of polarization parallel to the paper sheet and bieng deflected about 1 to 3° from the incident optical axis. The lens 9 is provided to separate the above two beams of polarized light in distinctive directions from each other. The beam of polarized light going straight arrives at a photoelectric cell 10, while the beam of polarized light deflected from its original optical path is reflected at a mirror 11 and arrives at another photoelectric cell 20 through a sector mirror.

The second beam leaving the prism assembly 4 is reflected by a mirror 12 and 13 toward another optical path, at the end of which the photoelectric cell 20 is located. The mirror 12 is located at the position where the lens 3 makes the image of the outlet slit of the monochromator 2. In this manner two beams leaving the prism assembly 4 may be distinctly separated from each other into their respective optical paths.

In the optical path for the second beam of polarized light leaving the prism assembly 4 are aranged a mirror 13, a collimating lens 14, a reference cell 15, a prism assembly 16, another lens 17, a screen 18 with a slit 18' and a sector mirror 19. The reference cell 15 is provided to compensate light absorption which might be caused by the sample cell 7 itself and comprises a container made of the same material and in the same dimensions as that of the sample cell 7. In case the sample to be tested is contained as a solution in the sample cell 7, the reference cell 15 is filled with the same solvent. The prism assembly 16 is provided to compensate any loss of optical energy which might be caused by light absorption and/or reflection in the Senalmont prism 8 and accordingly it is of the same construction and dimension as the Senalmont prism 8. The polarized light entering into the prism assembly 16 is divided into two beams of polarized light having different planes of polarization, respectively. The beam having its plane of polarization parallel to the paper sheet goes straight through the lens 17, passes through the slit 18' of the screen 18 and then arrives at the photoelectric cell 20, while the beam of polarized light having its plane of polarization vertical to the paper sheet is deflected from the original optical axis and prevented by the screen 18 to enter into the photoelectric cell 20. The lens 17 increases its deflection. The sector mirror 19 which may be of any known type, either rotational or vibrational, provides means for switching light passage so that the light beam passing through said slit 18' and the light beam reflected from said mirror 11 reaches alternately the photoelectric cell 20. It should be understood that the photoelectric cell 10 produces electric output signal in response to rotatory polarization, while the photoelectric cell 20 produces electric output signal in response to light absorption. The photoelectric cells 10 and 20 may be replaced by any other photoelectric means such as photoelectric amplifying tube.

In the foregoing description with reference to FIG. 1, the optical path designated by the series of the reference numerals 4–5–6–7–8–9–10 is for measurement of rotatory polarization and hereinafter known as the optical path for the rotatory polarization measuring. The optical path designated by the series of the reference numerals 4–5–6–7–8–9–11–19–20 is for measurement of light absorption and accordingly hereinafter known as the sample side optical path for the light absorption measuring. The optical path designated by the series of reference numerals 4–12–13–14–15–16–18–19–20 is arranged for compensating various errors which are inevitable in measuring light absorption and accordingly hereinafter known as the reference side optical path for the light absorption measuring.

Figure 2:
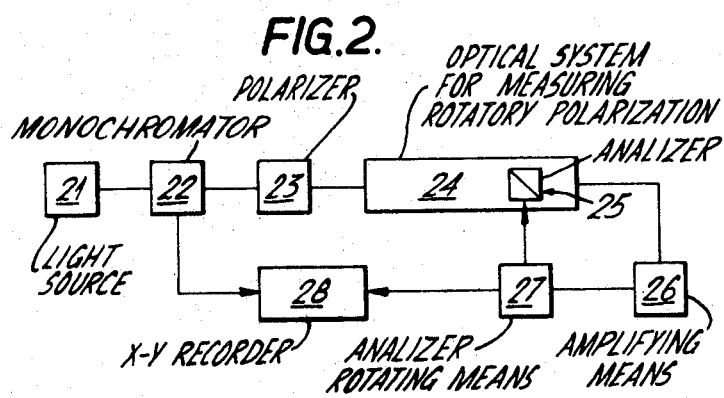
FIG. 2 is a block diagram showing an arrangement for measuring spectrorotatory polarization in accordance with the invention.

The device according to the invention is particularly unique in its two-way-operation, namely, on one hand as a spectropolarimeter which automatically records the rotation of polarized light caused by a sample inserted in the optical path and on the other as an absorption meter which automatically records light absorption caused by the same sample. FIG. 2 schematically illustrates the arrangement for recording rotatory polarization of a sample. The arrangement comprises a light source 21, a monochromator 22, a polarizer 23, an optical system 24 for measuring rotatory polarization, an amplifying means 26, means 27 for rotating said analyzer and an XY-recorder 28. Said optical system 24 includes an analyzer 25. The light source 21 includes a lamp for illuminating the system and electric source stablizer circuit. The polarizer 23 may comprise a Rochon prism 4 as indicated in FIG. 1. The amplifying means 26 comprises a circuit for amplifying signals from the photoelectric cell 20 as indicated in FIG. 1 to obtain electric power enough to actuate a servomotor which is included in the analyzer rotating means 27. The analyzer rotating means 27 comprises a servomotor, gearing for rotating the analyzer 25 and a signal converter for producing electric signal in response to the angle of rotation of the analyzer 25. The X-axis of the XY-recorder 28 is communicated to means for varying the wave-length of the monochromator 22, while the Y-axis is electrically connected to said analyzer rotating means 27.

Figure 3:
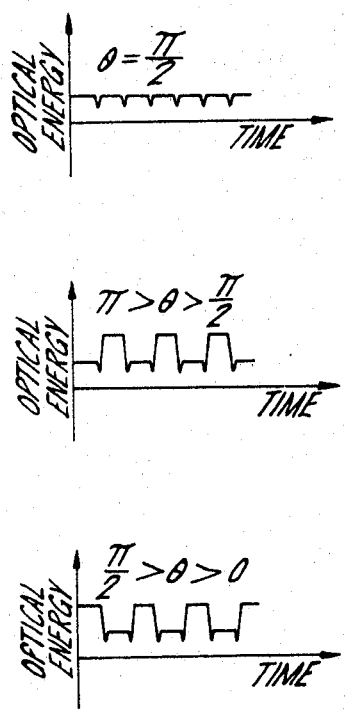
FIG. 3 is a series of diagrams illustrating the optical energy detected in the optical path for determining rotatory polarization.
Figure 4:
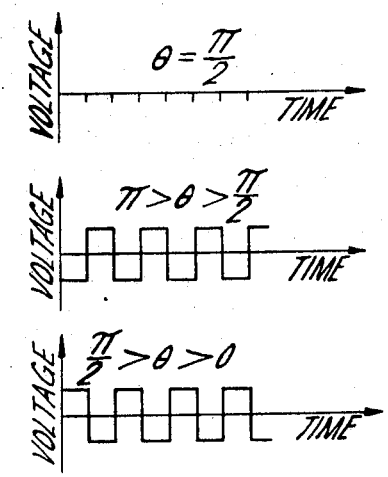
FIG. 4 is a series of diagrams illustrating electrical output signals when the optical energy as shown in FIG. 3 is converted into electrical signals.

Operation to determine rotatory polarization according to the invention is as follows:

Referring to FIG. 2, the beam of light leaving the polarizer 23 is of monochromatic and linearly polarized light. After passing through the oscillator (indicated as 5 in FIG. 1) in the optical system 24, the polarized light becomes to oscillate about a mean direction. The oscillating polarized light is divided into a pair of two polarized components having their respective planes of polarization orthogonal to each other during passing through the analyzer 25. The energy of the polarized component going straight along the optical path for measuring the rotatory polarization is varied at the frequency identical with that of the oscillator. FIG. 3 is a series of diagrams illustrating intensity of the optical energy of the light leaving the analyzer 25 for various azimuth of incidence of the polarized light. $\theta$ indicates the azimuth of the incidence of the polarized light. The output signals from the photoelectric cell 10 of FIG. 1 respond to the intensity of this optical energy and accordingly has a similar wave form to that illustrated in FIG. 3. The output signals may be in turn changed to electrical signals as shown in FIG. 4. If such the signals as shown in FIG. 4 are applied to a servomotor, the servomotor will be rotated in either a certain or opposite direction according to azimuth of incidence of the polarized light, namely whether it is within the range from $\pi$ to $\pi/2$ or within the range from $\pi/2$ to 0. In case where the azimuth is accurately equal to $\pi/2$, the servomotor will stop. The Y-axis of the recorder 28 is adjusted to the zero level with the sample cell filled with optically inactive liquid. The sample solution is in turn substituted for the optically inactive liquid in the sample cell. The azimuth of incidence of the polarized light upon the analyzer is varied according to the amount of rotation of polarized light of the sample. The azimuth $\theta$ is represented by the following formula:

$$\theta = \pi/2 - \alpha$$

wherein $\alpha$ is the amount of rotation of polarized light of the sample. The servomotor will actuate the analyzer until the azimuth on the analyzer becomes $\pi/2$. The angle of rotation of the analyzer is $\alpha$ which is identical to the amount of polarized light of the sample. Rotation of the analyzer is indicated by the recorder 28 at its direction of the Y-axis.

If the wave length is continuously varied, the amount of rotation of polarized light of the sample is varied. The analyzer 25 is rotated following the variation in the amount of rotation of polarized light. Accordingly a wave length-rotatory polarization curve is drawn on a chart of the recorder 28. This is the rotatory dispersion curve.

Figure 5:
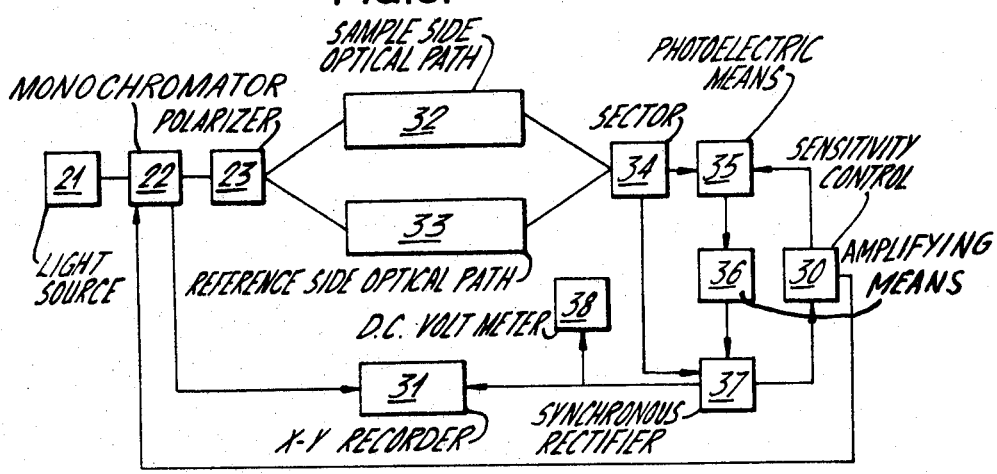
FIG. 5 is a block diagram schematically illustrating an arrangement for determining light absorption according to the invention.

FIG. 5 diagramatically illustrates the arrangement for recording light absorption of the sample to be studied. The light source 21, the monochromator 22 and the polarizer 23 included in the arrangement for recording rotatory polarization are available simultaneously for recording light absorption. The light source 21 comprises a lamp for illuminating the system and electric source stabilizer circuit. The monochromator 22 is provided with means for automatically and continuously varying the wavelength, means for transmitting electrical signals to the XY-recorder 31 and means for automatically controlling the width of the outlet slit of the monochromator responsive to the signals from the sensitivity control 30. The polarizer 23 comprises a Rochon prism 4 as indicated in FIG. 1 and serves as a beam-splitter. 32 and 33 generally indicate the sample side optical path and the reference side optical path for the light absorption measuring, respectively. 34 indicates the sector which is identified with the sector mirror 19 in FIG. 1. 35 is the photoelectric means identical with that indicated as 20 in FIG. 1. 36 indicates amplifying means for amplifying the signals from the photoelectric cell 35 without any changes of the wave form. 37 indicates a synchronous rectifier for discriminating the electrical signal responsive to the light energy passing through the sample side optical path for the light absorption measuring from that responsive to the light energy passing through the reference side optical path and producing direct current signals according to their amplitudes. The sensitivity control 30 produces electrical signals for controlling the width of the slit of the monochromator 22 so that the reference signals from 37 may be always maintained at a predetermined value. 31 is a XY-recorder of which the X-axis is electrically connected to means for varying the wavelength while the Y-axis is operative in response to the output according to the sample signal. 38 is a D.C. voltmeter for indicating the output voltage.

Figure 6A:
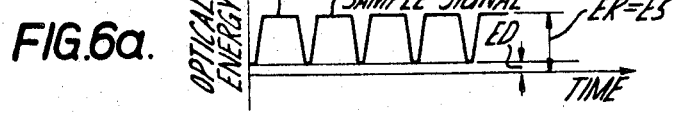
FIGS. 6A and 6B are a series diagrams illustrating the optical energy detected in the optical path for determining light absorption according to the invention.

Operation of the light absorption measuring is as follows:

The two cells 7 and 15 (FIG. 1) are filled with the same liquid. The prism assembly 16 for compensation use is rotated until the D.C. output of the synchronous rectifier responsive to the reference signal (hereinafter referred as "the reference voltage") becames equal to that responsive to the sample signal (hereinafter referred as "the sample voltage"). In this case, the reference signal E$r$ and the sample signal E$s$ becomes equal as shown in FIG. 6A. In this condition, the recorder 31 and the voltmeter 38 are adjusted so that both indicate the maximum penetrating power of 100%.

Figure 6B:
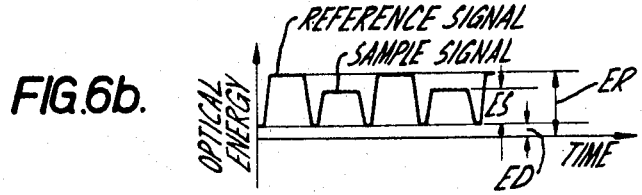

When a sample solution is replaced in the sample cell, the sample signal E$s$ will decrease with both the recorded and voltmeter 38 indicating a lower value as shown in FIG. 6B. If the wavelength is varied, the sample signal E$s$ will be changed responsively thereto. The change is momentarily recorded by the recorder 31 and indicated by the voltmeter 38. Any changes in the sample signal E$s$ other than those due to the sample and the variation of the wavelength may be completely compensated by varying both the sensitivity of the photoelectric means 35 and the width of the slit of the monochromator 22 so that the reference signal E$r$ may be maintained in a predetermined value by the operation of the sensitivity control 30.

According to the invention, the sample voltage is detected in the form of a ratio with respect to the reference voltage as well as in usual spectrophotometers of two optical path alternately illuminating and electrically null type.

In another embodiment of the invention, the device may be of an optically null system through the utilization of a suitable optical wedge. For example, an optical wedge is inserted in the reference side optical path for the light absorption measuring. The electric output of the amplifying means 35 is further amplified and phase-adjusted by any conventional means and then supplied to a servomotor which in turn moves the optical wedge. The position of the optical wedge is electrically detected and recorded in the Y-axis of the recorder. In this manner an optically null system is obtained.

In the embodiment of the invention described in detail in the above with reference to the drawings, the Rochon prism 4 used as the polarizer can be replaced with the Sénalmont prism 8 used as the analyzer, with the compensation prism 16 being substituted by a Sénalmont prism or a Rochon prism. In case the angle of the rotation of the polarized light is extremely small, the above mentioned Sénalmont prism or Rochon prisms may be replaced by Dove prisms. The polarization plane oscillator 5 may be a Faraday cell. The polarization plane oscillator 5 may be dispensed with if either the polarizer or analyzer is oscillated.

From the foregoing, it can be seen that simple, efficient and economical means have been provided for accomplishing all of the objects and advantages of the invention. Nevertheless, it is apparent that many changes in the details of construction, and arrangement of parts may be made without departing from the spirit of the invention as expressed in the accompanying claims and the invention is not limited to the exact matters shown and described as only the preferred matters have been given by way of illustration.

I claim:

1. A device for measuring simultaneously both rotatory polarization and light absorption of a sample comprising: a polarizer, a light source directing a beam of monochromatic light so as to illuminate said polarizer; said polarizer comprising a diplopic prism assembly splitting said beam of monochromatic light from said light source into a first pair of beams of polarized light having first and second optical paths, the planes of polarization of said first pair of polarized light beams being orthogonal to each other; said first optical path for one beam of said first pair of polarized light beams from said polarizer including in optical alignment a polarization plane oscillator, a sample cell, an analyzer comprising a diplopic prism assembly dividing the polarized light from said sample cell into a second pair of beams of polarized light extending in different directions, the planes of polarization of said second pair of polarized light beams being orthogonal to each other, and photoelectric means for detecting one beam of said second pair of polarized light beams emitted from said analyzer; electrical means connected to said photoelectric means for determining the rotatory polarization of a sample in said sample cell in response to the light energy received by said photoelectric means; said second optical path for the other beam of said first pair of polarized light beams from said polarizer including in optical alignment a reference cell having the same absorptive power as said sample cell, a diplopic prism assembly for compensation use dividing the polarized light from said reference cell into a second pair of beams of polarized light extending in different directions, the planes of polarization of said second pair of polarized light beams being orthoganol to each other, and a photoelectric means for detecting one beam of said second pair of polarized light beams emitted from said diplopic prism assembly included in said second optical path; the other beam of said second pair of polarized light beams emitted from said analyzer in said first optical path defining a divisional optical path, said divisional optical path reaching said photoelectric means in said second optical path, means for alternately directing said one beam of said second pair of polarized light beams emitted from said diplopic prism assembly included in said second optical path and said other beam of polarized light defining said divisional optical path onto said photoelectric means is said second optical path; and electrical means connected to said photoelectric means in said second optical path for determining the light absorption of said sample in said sample cell in response to the signals received by said photoelectric means in said second optical path.

2. A device for measuring simultaneously both rotatory polarization and light absorption as claimed in claim 1, wherein said polarizer is a Rochon prism and each of said diplopic prisms included in said first and second optical paths is a Sénalmont prism.

References Cited

UNITED STATES PATENTS 3,039,353    6/1962    Coates et al. _____ 88—14
3,164,662    1/1965    Grosjean et al. _____ 88—14

JEWELL H. PEDERSEN, *Primary Examiner.*

F. L. EVANS, *Assistant Examiner.*